United States Patent
Kim et al.

(10) Patent No.: US 8,681,285 B2
(45) Date of Patent: Mar. 25, 2014

(54) LIQUID CRYSTAL DISPLAY DEVICE

(75) Inventors: Hyun Ki Kim, Daegu (KR); Jong Chil Lee, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 119 days.

(21) Appl. No.: 12/978,823

(22) Filed: Dec. 27, 2010

(65) Prior Publication Data

US 2011/0211140 A1 Sep. 1, 2011

(30) Foreign Application Priority Data

Feb. 26, 2010 (KR) ........................ 10-2010-0018188

(51) Int. Cl.
*G02F 1/1333* (2006.01)
(52) U.S. Cl.
USPC ........................................................... 349/58
(58) Field of Classification Search
USPC ........................................................... 349/58
See application file for complete search history.

(56) References Cited

U.S. PATENT DOCUMENTS

| | | | |
|---|---|---|---|
| 6,774,959 B2 * | 8/2004 | Agata et al. ...................... | 349/58 |
| 7,843,526 B2 * | 11/2010 | Lee et al. ......................... | 349/58 |
| 2007/0103853 A1 * | 5/2007 | Kao ................................. | 361/681 |
| 2009/0040706 A1 * | 2/2009 | Kobayashi et al. ........... | 361/681 |

FOREIGN PATENT DOCUMENTS

CN 1291742 4/2001

* cited by examiner

*Primary Examiner* — Wen-Ying P Chen
(74) *Attorney, Agent, or Firm* — McKenna Long & Aldridge, LLP

(57) ABSTRACT

Disclosed is a LCD device adapted to improve display quality and simplify configuration. The LCD device includes: a liquid crystal display panel; a driver printed-circuit-board disposed by an edge of the liquid crystal display panel; a backlight unit disposed under the liquid crystal display panel; a lower case configured to sequentially receive the backlight unit and the liquid crystal display panel; and a support plate disposed an outer side surface and configured to support the driver PCB which is positioned in the outside of the lower case.

8 Claims, 2 Drawing Sheets

LIQUID CRYSTAL DISPLAY DEVICE

CROSS-REFERENCE TO RELATED APPLICATION

This application claims priority under 35 U.S.C. 119 to Korean Patent Application No. 10-2010-0018188, filed on Feb. 26, 2010, which is hereby incorporated by reference in its entirety.

BACKGROUND

1. Field of the Disclosure

This disclosure relates to a liquid crystal display (LCD) device, and more particularly to an LCD device adapted to improve display quality and to simplify the configuration.

2. Description of the Related Art

Cathode ray tubes (CRTs) correspond to one of display devices which are widely used. The CRTs are mainly used as monitors for TVs, measuring apparatuses, information terminals, and so on. However, the heavy weight and large size of the CRTs have been a major hindrance to the manufacturing of small, light electronic products.

To address this matter, LCD devices are gradually being used in a wide range of applications due to their advantages such as light weight, thin thickness, and low power consumption. Furthermore, LCD devices are being manufactured to have even larger screens, be thinner, and consume less power, in order to meet requirements of users.

LCD devices display images by controlling the amount of light transmitted through liquid crystal. However, LCD devices are not self-illuminating display devices, unlike CRTs. As such, an LCD device includes a backlight unit disposed on the rear surface of an LCD panel and configured to have a separate light source which provides light necessary to display an image.

The LCD panel includes a thin film transistor substrate and a color filter substrate disposed to face each other and combined with each other by a seal pattern. Also, the LCD panel further includes a liquid crystal material which is injected between the thin film transistor substrate and the color filter substrate after the combination of two substrates. Such an LCD panel receives driving signals from a driver printed-circuit-board (PCB) which is disposed by an edge of the LCD panel. The driving signals are applied to gate and data lines of the LCD panel.

The backlight unit is classified as either an edge type or a direct type in accordance with the disposition of its light source. The edge type backlight unit includes a light source disposed in a position corresponding to a side of the LCD panel, and a light guide plate configured to scatter incident light from the light source. As such, it is easy for the edge type backlight unit to become thinner. On the other hand, the direct type backlight unit includes a plurality of light sources arranged at a fixed distance under the LCD panel. The plurality of light sources directly applies light to the rear surface of the LCD panel. Accordingly, the direct type backlight unit is mainly used for large sized LCD devices.

The LCD device ordinarily includes an LCD module. The ordinary LCD module includes a bottom cover configured to receive the backlight unit, a panel guide configured to support lower surface edges of the LCD panel, and a top case configured to cover upper surface edges of the LCD panel. This ordinary LCD module can be defined into a display area used to display images and a non-display area not used to display the images. The non-display area corresponds to the edge area of the LCD panel and the outer area adjacent thereto which are encompassed with the top case and bottom cover.

Such an ordinary LCD module further includes a driver printed-circuit-board (PCB) disposed by an edge of the LCD panel. The driver PCB is positioned within the non-display area. As such, the non-display area must be wider than the width of the driver PCB. Accordingly, it is difficult for the LCD module to minimize the non-display area due to the driver PCB disposed by the LCD panel. Moreover, the widened non-display area deteriorates the display quality of the LCD module and/or device.

Also, the ordinary LCD module has the complexity described above. Due to this, the ordinary LCD module must be limited not only to reduce the assembling time, the cost, and the total weight but also to make slimmer.

BRIEF SUMMARY

Accordingly, the present embodiments are directed to an LCD device that substantially obviates one or more of problems due to the limitations and disadvantages of the related art.

An object of the present embodiment is to provide an LCD device that is adapted not only to improve display quality but also to simplify the configuration.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an LCD device includes: a liquid crystal display panel; a driver printed-circuit-board disposed by an edge of the liquid crystal display panel; a backlight unit disposed under the liquid crystal display panel; a lower case configured to sequentially receive the backlight unit and the liquid crystal display panel; and a support plate disposed an outer side surface and configured to support the driver PCB which is positioned in the outside of the lower case.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
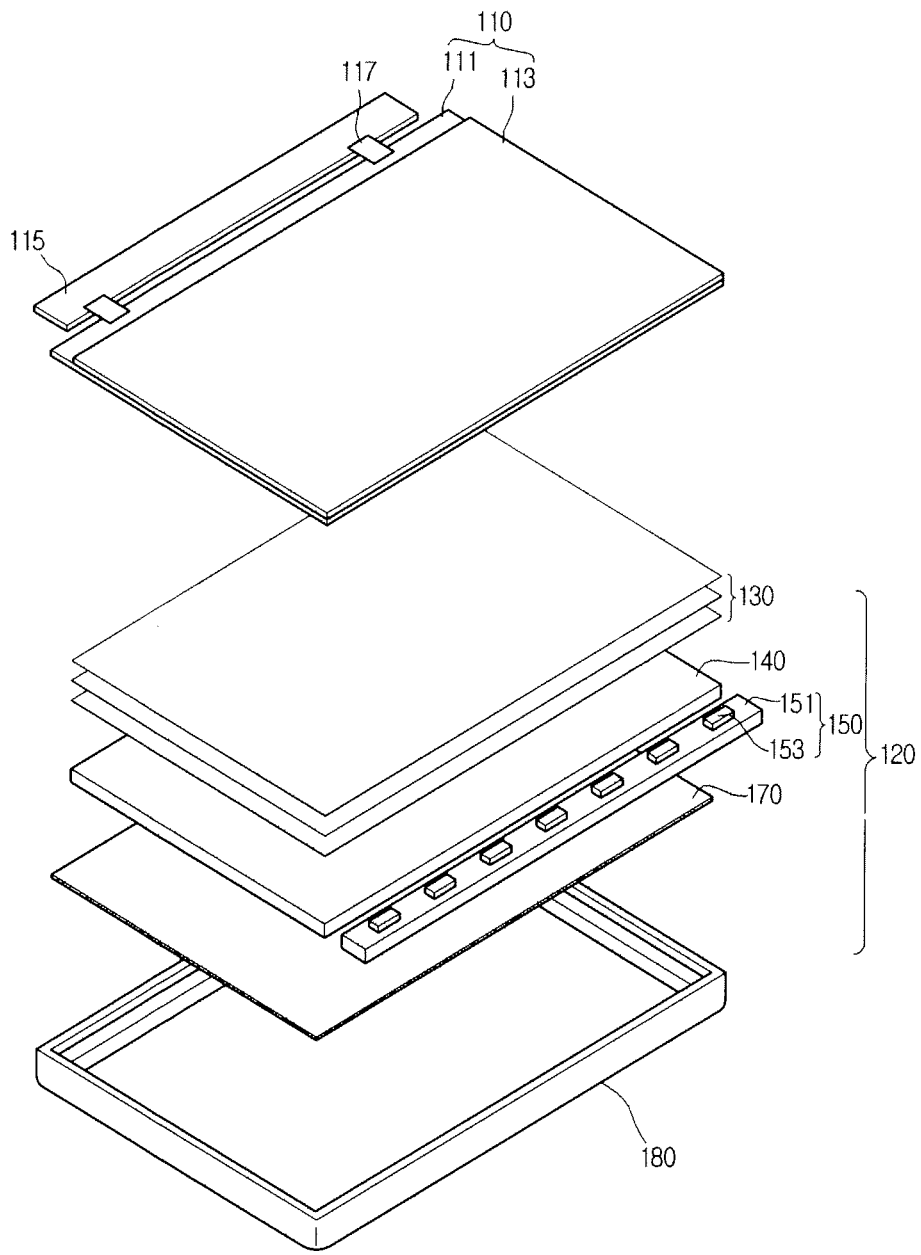
FIG. 1 is a disassembled perspective view showing an LCD module according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
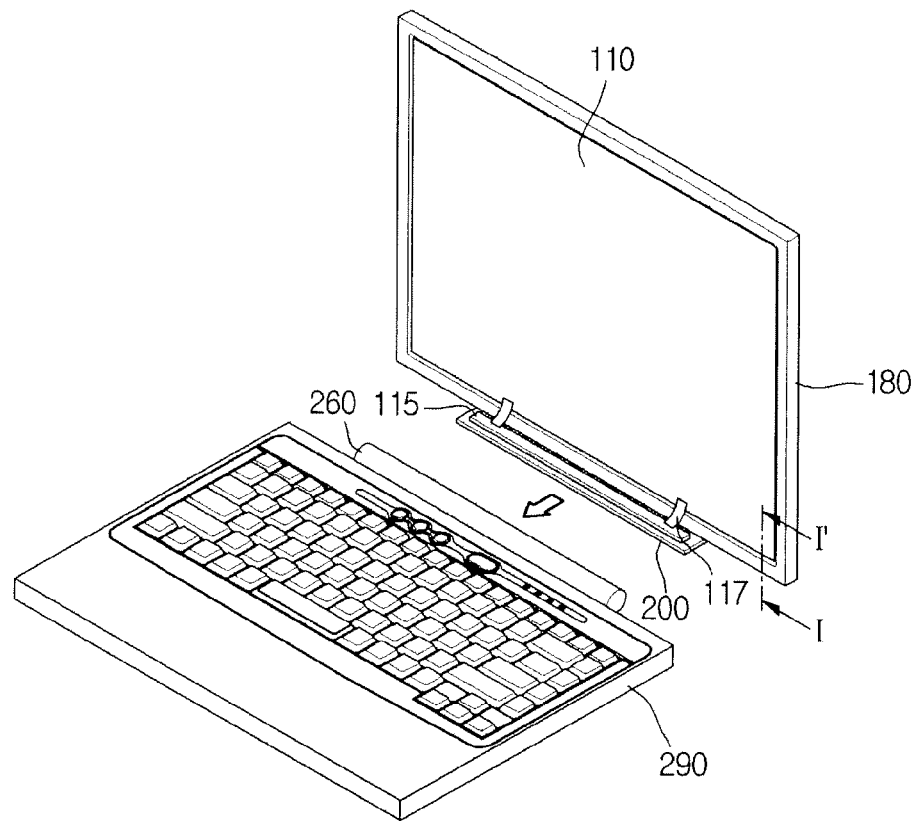
FIG. 2 is a perspective view showing an LCD device for the notebook computer according to an embodiment of the present disclosure.
Figure 3:
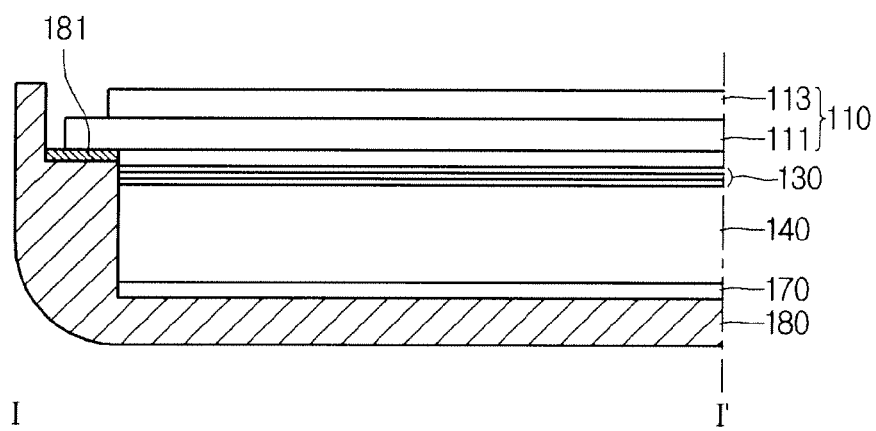
FIG. 3 is a cross-sectional view showing an LCD module taken along a line I-I' of FIG. 1.

FIG. 1 is a disassembled perspective view showing an LCD module according to an embodiment of the present disclosure. FIG. 2 is a perspective view showing an LCD device for the notebook computer according to an embodiment of the present disclosure. FIG. 3 is a cross-sectional view showing an LCD module taken along a line I-I' of FIG. 1.

As shown in FIGS. 1 through 3, an LCD device according to an embodiment of the present disclosure includes an LCD module. The LCD module includes an LCD panel 110 configured to display images, and a backlight 120 disposed under the LCD panel 110 and configured to apply light to the lower surface of the LCD panel 110. The LCD module further includes a lower case 180 configured to accommodate the LCD panel 110 and the backlight unit 120.

The LCD panel 110 includes a thin film transistor substrate 111 and a color filter substrate 113 disposed to face each other and combined to maintain a uniform cell gap between them. The LCD panel 110 further includes a liquid crystal layer (not shown) interposed between the two substrates 111 and 113.

Although they are not shown in detail in the drawings, the thin film transistor substrate 111 and the color filter substrate 113 will now be described in detail. The thin film transistor substrate 111 includes a plurality of gate lines and a plurality of data lines formed to cross each other, and thin film transistors formed at the intersections of the plurality of gate lines and the plurality of data lines. The plurality of gate lines and the plurality of data lines crossing each other define the pixels. The thin film transistors are connected to pixel electrodes each included in the pixels, respectively. On the other hand, the color filter substrate 113 includes: red, green, and blue color filters opposite to the pixels; a black matrix configured to rim each of the color filters; and a common electrode formed to cover the color filters and the black matrix. The black matrix is formed to shield the gate lines, the data lines, and the thin film transistors.

The LCD module still further includes a driver printed-circuit-board (PCB) 115 disposed by an edge of the LCD panel 110. The driver PCB 115 applies driving signals to the gate and data lines on the LCD panel 110. To this end, the driver PCB 115 is electrically connected to the LCD panel 110 by means of COFs (chip on films) 117. The COFs 117 can be replaced with tape carrier packages (TCPs).

The backlight unit 120 disposed under the LCD panel 110 includes a light guide plate 140 configured to convert spotted or linear light into two-dimensional light, and light source unit 150 disposed parallel to a side surface of the light guide plate 140 configured to emit light. The backlight unit further includes a reflection sheet 170 disposed under the light guide plate 140 and configured to reflect light progressing downwardly from the light guide plate 140 toward the LCD panel 110, and optical sheets 130 disposed over the light guide plate 140 and configured to scatter and converge incident light from the light guide plate 140. The light source unit 150 includes a PCB 151, and a plurality of light emission diodes (LEDs) 153 arranged at a fixed interval on the PCB 151.

Furthermore, the LCD module according to the present disclosure includes a support plate 200 disposed at an edge of the lower case 180 and configured to support the driver PCB 115. The support plate 200 makes the position of the driver PCB 115 to be at the outside of the lower case 180. In other words, the support plate 200 functions to reduce the non-display area of the LCD module. Such a support plate 200 can be disposed to incline from an edge of the lower case 180 at a fixed angle with respect to the side surface of the lower case 180. Also, the support plate 200 can be fastened to the lower case 180 by means of a hinge member or others in order to allow it to pivot. In this case, the support plate will be able to pivot within a fixed angle.

In this manner, the driver PCB 115 is disposed at the outside of the lower case 180 by the support plate 200. As such, the non-display area of the LCD module can be reduced. Therefore, the display quality of the LCD module and/or device according to the present disclosure can be improved.

According to an embodiment of the present disclosure, the backlight unit 120 and the LCD panel 110 are sequentially placed into the lower case 180. The lower case 180 includes inner side surfaces each formed in a single stair structure. As such, the lower surface edges of the LCD panel 110 are supported by the inner side surfaces of the lower case 180 with the single stair structure. The lower case 180 can include a fixing member 181 disposed on the stair surfaces of its inner side surfaces. The fixing member 181 is in surface contact with the lower surface edges of the LCD panel 110, thereby allowing the LCD panel 110 to be fastened to the stair surfaces of the lower case 180. Therefore, the LCD module can be assembled by sequentially placing the reflection sheet 170, light guide plate 140, light source unit 150 and optical sheets 130 on the inner bottom surface of the lower case 180, and by fastening the lower surface edges of the LCD panel 110 on the fixing member 181.

In this way, the LCD module according to the present disclosure allows all the backlight unit 120 and LCD panel 110 to be received and fastened into the lower case 180 with the inner side surfaces of a single stair structure. Therefore, the total configuration of the LCD module can be simplified.

Moreover, the LCD module enables the backlight unit 120 and LCD panel 110 to be fastened by only the lower case 180. As such, the LCD module according to the present disclosure can reduce the non-display area adjacent to the edges of the LCD panel 110, in comparison with the ordinary LCD module configured to include the top case, the panel guider and the bottom cover.

The LCD module according to the present disclosure can be applied to a notebook computer. In other word, the LCD module is used as a monitor of the notebook computer. In this case, the LCD module will be combined with a body 290 of the notebook computer which includes an input portion, a storage portion, an arithmetic portion, a power supply portion, and a system driver.

The body 290 of the notebook computer includes a hinge 260 disposed on one of its side surfaces. The hinge 260 is combined with the LCD module, in order to fasten the LCD module to the body 260 of the notebook computer and allow it to pivot. The hinge 260 enables the LCD module to pivot within about 180° with respect to the upper surface of the body 290 of the notebook computer. In other words, the LCD module and the body 290 of the notebook computer combined with each other by the hinge 260 can be folded with and/or unfolded from each other. The support plate 200 disposed on one side surface of the bottom case 180 can be inserted into the hinge 260.

As described above, the LCD device according to the embodiment of the present disclosure allows the backlight unit 120 and LCD panel 110 to be sequentially received and fastened into the lower case 180 with the inner side surfaces of a single stair structure. Therefore, in comparison with the ordinary LCD module configured to include the top case, the panel guider and the bottom cover, the LCD device according to the present disclosure can simplify the configuration, as well as easily make slim. Furthermore, the LCD device according to the present disclosure can reduce weight, manufacturing time and cost.

Also, the LCD device according to the embodiment of the present disclosure enables the backlight unit 120 and LCD panel 110 to be fastened by means of only the lower case 180. As such, the LCD device according to the present disclosure can reduce the non-display area including the edges of the LCD panel 110.

Moreover, the LCD device according to the embodiment of the present disclosure ensures the driver PCB 115 connected to the LCD panel 110 to be mounted to the support plate 200 which is disposed at the outside of the lower case 180. As such, the non-display area of the LCD module can be reduced. Therefore, the LCD device according to the present disclosure can improve the display quality.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A liquid crystal display device comprising:
    a liquid crystal display panel;
    a driver printed-circuit-board disposed by an edge of the liquid crystal display panel;
    a backlight unit disposed under the liquid crystal display panel;
    a lower case configured to sequentially receive the backlight unit and the liquid crystal display panel; and
    a support plate disposed on an outer side surface and configured to support the driver PCB which is positioned in the outside of the lower case,
    wherein the lower case configured to accommodate the backlight unit and the liquid crystal display panel is combined with a body of a notebook computer,
    wherein the lower case replaces a top case, panel guider and bottom cover, and
    wherein the support plate is inserted into the inner side of the body of the notebook computer.

2. The liquid crystal display device claimed as claim 1, wherein the support plate is fastened to the outer side surface of the lower case by means of a hinge member.

3. The liquid crystal display device claimed as claim 2, wherein the support plate is pivoted within a fixed angle with respect to the outer side surface of the lower case.

4. The liquid crystal display device claimed as claim 1, wherein the body of a notebook computer includes an input portion, a storage portion, an arithmetic portion, a power supply portion, and a system driver.

5. The liquid crystal display device claimed as claim 4, wherein the notebook computer includes a hinge disposed on an edge of the body.

6. The liquid crystal display device claimed as claim 5, wherein the support plate is inserted into the inner side of the hinge.

7. The liquid crystal display device claimed as claim 1, wherein the lower case includes inner side surfaces each formed in a single stair structure.

8. The liquid crystal display device claimed as claim 7, further comprising a fixing member disposed on stair surfaces of the inner side surface of the lower case and configured to be in surface contact with the lower surface edges of the liquid crystal display panel.

* * * * *